United States Patent [19]

Wu

[11] 4,126,379
[45] Nov. 21, 1978

[54] LIGHT-CONDENSING INSTRUMENT

[76] Inventor: Sheng H. Wu, No. 1, Alley 2, Chung Chen Rd., Tan Shui, Taipei Hsien, Taiwan, Taiwan

[21] Appl. No.: 742,213

[22] Filed: Nov. 15, 1976

[51] Int. Cl.² .................. G02B 17/00; G02B 27/00
[52] U.S. Cl. .................................. 350/260; 350/264
[58] Field of Search ............ 350/258, 259, 260, 264

[56] References Cited
U.S. PATENT DOCUMENTS 1,254,520  1/1918  MacDuff ........................... 350/258
3,157,089  11/1964  Menefee ............................ 350/258
3,511,559  5/1970  Foster ............................... 350/258

Primary Examiner—Richard A. Wintercorn
Attorney, Agent, or Firm—Holman & Stern

[57] ABSTRACT

An instrument for condensing the natural light into the inside of room is disclosed. By the combination of several convexo-convex lens and convexoplane lenses and fluorescent mirror, the natural light can be absorbed, condensed and filtered to illuminate the inside of a room. Meanwhile, a controllable hood will be utilized as a filter screen if the natural light is too dazzling.

1 Claim, 3 Drawing Figures

LIGHT-CONDENSING INSTRUMENT

BRIEF SUMMARY OF THE INVENTION:

The electric lamp and fluorescent lamp are most popular artificial illuminating devices in the buildings. But these conventional instruments have two shortcomings. First, the artificial light came from the electric lamp or fluorescent lamp can't compare with the natural light of sun in spite of the former illuminates the articles so brightly as the latter. Second, any kind of artificial illuminating devices has to consume the electric energy. In particular, most of the electric energy is transferred into the heat, not the light. At the daytime, the sun light can't be conserved in any method to illuminate the buildings at nighttime.

This invention utilizes a convexoconvex lens as the natural light absorber. Having been condensed by the first convexoconvex lens, the light passes through two convexoplane lenses and projects into another convexoplane lens which is coated by a layer of fluorescent powder to filter and magnify and reflect the light. Finally, an ordinary lamp shade reflects the fluorescent light into the room for the purpose of illumination.

Beyond the first convexoconvex lens, a hood is utilized as the controllable screen to prevent the sun light if the light is found too dazzling.

Figure 1:
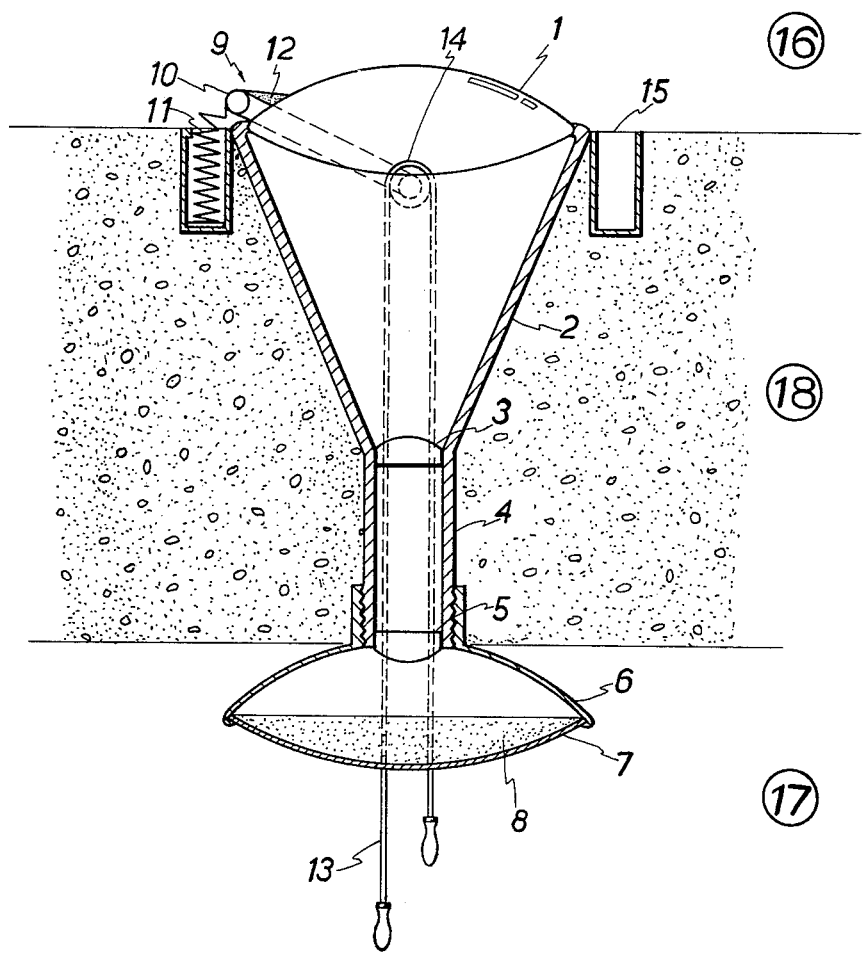
FIG. 1 illustrates the structure of this invention.
Figure 2:
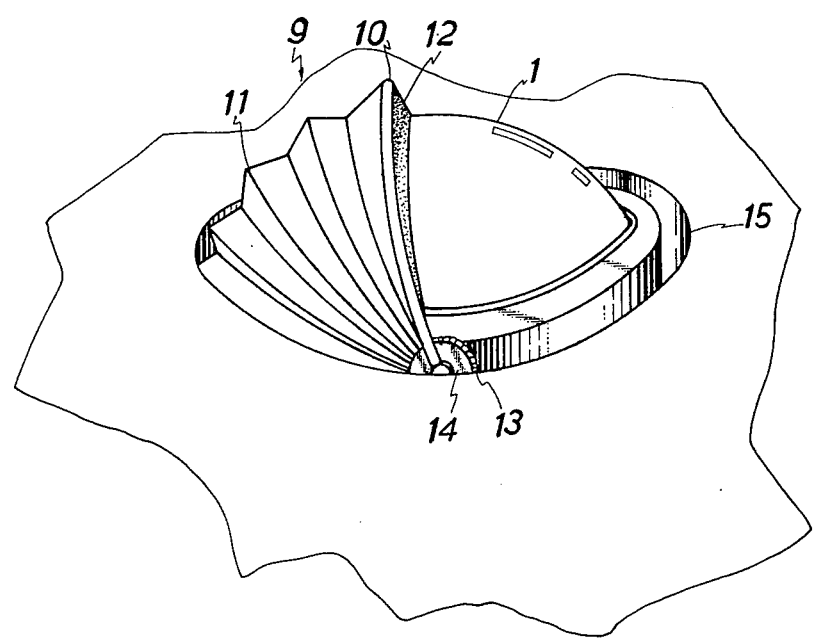
FIG. 2 illustrates the relationships between the hood and convexoconvex lens in this invention.

DETAILED DESCRIPTION:

With reference to the drawings, this invention is installed at the roof or the wall of the buildings. A convexoconvex lens 1 is installed at the opening of a funnel 2. A convexoplane lens 3 is utilized upon the pipe 4. At the bottom end of the pipe 4, another convexoconvex lens 5 is installed also. A lamp shade 6 connecting with the pipe 4 is utilized to reflect the light from the fluorescent mirror 7. The fluorescent mirror 7 is a convexoplane lens which is coated by a layer of fluorescent powder 8.

Over the convexoconvex lens 1, a hood 9 is installed for the purpose of protecting. The hood 9 comprises of a hoop 10 and the cover 11. A brush 12, which is made from the cotton or sponge, is connected with the hoop 10 to wipe the convexoconvex lens 1 clearly during it is pulled to open or to close. The rope 13 and wheel 14 control the opening and closing of the hood 9. The groove 15 is utilized to receive the hoop 10.

Figure 3:
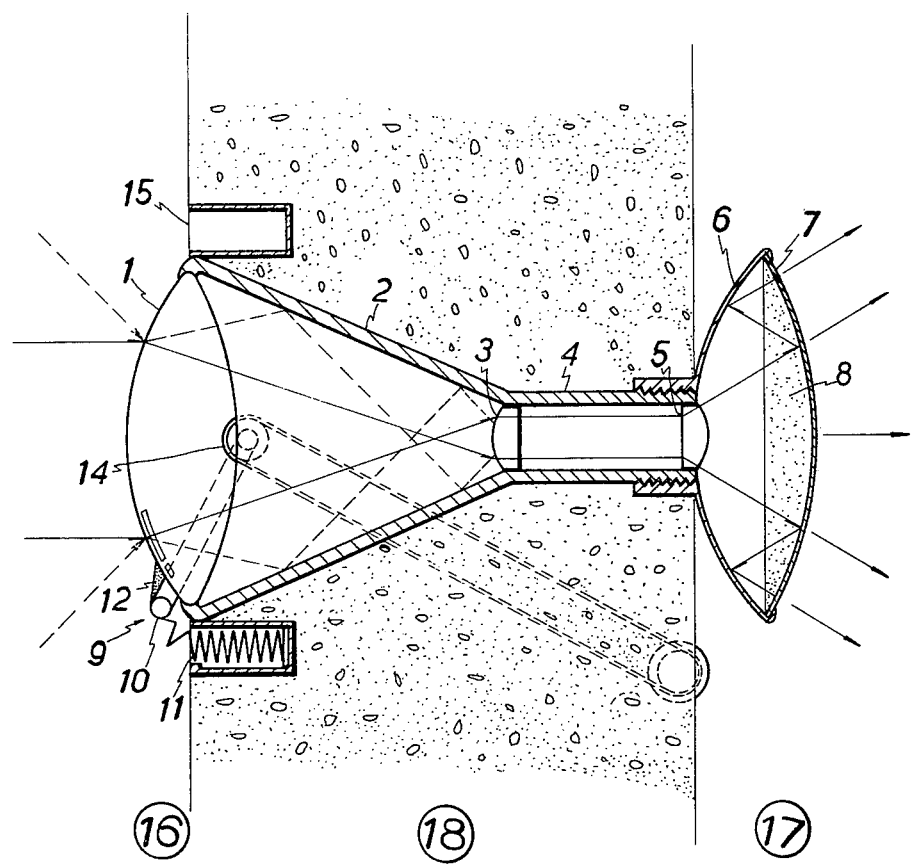
FIG. 3 depicts the pathway of light in passing through the lenses of this invention.

In the FIG. 1 and FIG. 3, 16 indicates the outside of room; 17 indicates the inside of room; 18 indicates the wall or the roof of the building.

I claim:

1. A light-condensing and transmitting device installed in the top of a roof or in a wall of a building to collect, intensify, and transmit natural light or sun rays comprising, a funnel with its widest diameter portion facing outwardly mounted in said roof or wall, a convexoconvex lens mounted in said outwardly facing portion, a convexoplane lens installed at each end of the inwardly facing cylindrical pipe portion of said funnel with their plane surfaces in confronting relationship, a lamp shade connected to the inwardly-facing end of said pipe portion, said shade including a meniscus lens having a layer of fluorescent powder applied to its inner surface, a protective hood installed over said convexoconvex lens consisting of a cover attached to a pivotable hoop, a cotton brush or sponge attached to said hoop between the latter and said convexoconvex leans, and a rope and a pulley connected to said hoop at the pivot axis of said hoop, whereby as said rope and pulley open and close said protective hood, said brush or sponge clears said convexoconvex lens.

* * * * *